United States Patent
Lee

(10) Patent No.: US 8,508,933 B2
(45) Date of Patent: Aug. 13, 2013

(54) DOCKING STATION AND PORTABLE COMPUTER HAVING THE SAME AND A METHOD OF CONNECTING THE DOCKING STATION AND PORTABLE COMPUTER

(75) Inventor: Seung-won Lee, Yongin-si (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 122 days.

(21) Appl. No.: 12/360,441

(22) Filed: Jan. 27, 2009

(65) Prior Publication Data
US 2010/0002371 A1 Jan. 7, 2010

(30) Foreign Application Priority Data
Jul. 4, 2008 (KR) .................. 10-2008-0065161

(51) Int. Cl.
*H05K 5/00* (2006.01)
*H05K 7/00* (2006.01)
*H04M 1/00* (2006.01)

(52) U.S. Cl.
USPC ............ 361/679.44; 361/679.07; 361/679.08; 361/679.59; 455/575.1

(58) Field of Classification Search
USPC ............ 361/679.01, 679.02, 679.08, 679.09, 361/679.3, 679.55–679.59, 679.21, 679.26, 361/679.27, 679.29, 679.4–679.45, 681; 345/156, 157, 168, 169, 184; 455/325, 556.1, 455/550.1, 90.1, 575.1, 567, 58; 369/282, 369/291, 253, 44.16, 75.5; 174/535
See application file for complete search history.

(56) References Cited

U.S. PATENT DOCUMENTS

| 4,531,641 | A | * | 7/1985 | Archambault | 211/41.3 |
|---|---|---|---|---|---|
| 5,627,450 | A | | 5/1997 | Ryan et al. | |
| 6,098,952 | A | * | 8/2000 | Tonn | 248/688 |
| 6,583,985 | B2 | | 6/2003 | Nguyen | |
| 6,682,240 | B1 | * | 1/2004 | Chou | 400/691 |
| 2003/0189812 | A1 | * | 10/2003 | Yin et al. | 361/686 |
| 2005/0191884 | A1 | * | 9/2005 | Gustine et al. | 439/131 |
| 2008/0142662 | A1 | * | 6/2008 | Leung | 248/346.3 |

FOREIGN PATENT DOCUMENTS

| CN | 101201655 | 6/2008 |
|---|---|---|
| JP | 10-214134 | 8/1998 |
| KR | 10-2004-0034192 | 4/2004 |
| KR | 10-2006-0003554 | 1/2006 |

OTHER PUBLICATIONS

NB85036100 Mar. 1985 IBM Corp.*
Chinese Office Action dated Oct. 8, 2012 issued in CN 200910129740.4.
Office Action issued in Korean Application No. 10-2008-0065161 dated Jan. 29, 2013.
Office Action issued in CN Application No. 200910129740.4 dated May 9, 2013.

* cited by examiner

*Primary Examiner* — Zachary M Pape
*Assistant Examiner* — Jerry Wu
(74) *Attorney, Agent, or Firm* — Stanzione & Kim, LLP

(57) ABSTRACT

A docking station which is electrically connected to a computer main body unit of a portable computer, the docking station includes a docking main body which supports a rear area of the computer main body unit against an installation surface and is electrically connected with the computer main body unit, and an angle adjusting unit which is rotatably coupled to the docking main body to adjust an installation angle of the docking main body with respect to the installation surface.

28 Claims, 9 Drawing Sheets

DOCKING STATION AND PORTABLE COMPUTER HAVING THE SAME AND A METHOD OF CONNECTING THE DOCKING STATION AND PORTABLE COMPUTER

CROSS-REFERENCE TO RELATED APPLICATIONS

This application claims priority from Korean Patent Application No. 10-2008-0065161, filed on Jul. 4, 2008 in the Korean Intellectual Property Office, the disclosure of which is incorporated herein by reference in its entirety.

BACKGROUND OF THE INVENTION

1. Field of the Invention

The present general inventive concept relates to a docking station and a portable computer having the same, and more particularly, to a docking station and a portable computer having the same applied to various sizes.

2. Description of the Related Art

In general, a computer is classified as a desktop computer or a portable computer according to the main body casing, and recently, the portable computer has been widely used because of convenient portability, size, and improved design and performance.

The portable computer may further include a docking station electrically connected with a computer main body unit to add or expand separate functionality found in the computer main body unit.

The docking station allows the computer main body unit of the portable computer to be evenly mounted and supported to an installation surface. The docking station further allows an expansion slot, external storage device, and a local printer, etc. as well as other devices, to be available when the docking station is used in an office or home, and allows the computer main body unit of the portable computer to be used separately. The docking station is designed to correspond to the size of the computer main body unit of the portable computer.

However, when the conventional docking station is used with a portable computer with a different size, the height of the conventional docking station discords with the size of the computer main body unit of the portable computer so that the computer main body unit can fail to be stably mounted on the installation surface.

SUMMARY OF THE INVENTION

The present general inventive concept provides a docking station applied to a computer main body unit having various sizes.

The present general inventive concept also provides a portable computer having a docking station applied to a computer main body having various sizes.

Additional aspects and utilities of the present general inventive concept will be set forth in part in the description which follows and, in part, will be obvious from the description, or may be learned by practice of the general inventive concept.

Embodiments of the present general inventive concept can be achieved by providing a docking station which is electrically connected to a computer main body unit of a portable computer, the docking station including a docking main body which supports a rear area of the computer main body unit against an installation surface and is electrically connected with the computer main body unit and an angle adjusting unit which is rotatably coupled to the docking main body to adjust an installation angle of the docking main body with respect to the installation surface.

The angle adjusting unit may include a support unit which includes a hinge shaft, and a support protrusion which has a predetermined length in a transverse direction to an axial direction of the hinge shaft to rotate about the hinge shaft, and a hinge shaft accommodating unit which may be provided in the docking main body to accommodate the hinge shaft.

The hinge shaft may be formed of a metal material.

The hinge shaft accommodating unit may be provided as a pair to accommodate the opposite end parts of the hinge shaft, and the angle adjusting unit further includes a protrusion accommodating unit which is recessed from a bottom surface of the docking main body to accommodate the support protrusion between the pair of hinge shaft accommodating units.

The support protrusion may move between an accommodating position in which the support protrusion is accommodated to the protrusion accommodating unit, and an adjusting position in which the support protrusion rotates about the hinge shaft to adjust the installation angle of the docking main body.

The angle adjusting unit further includes an angle maintaining unit which prevents the support protrusion from rotating more than a predetermined angle to maintain the adjusting position.

The angle adjusting unit may be disposed to a rear area of the docking main body.

The angle adjusting unit further includes a protrusion cap which is detachably coupled to the support protrusion, and elongates the support protrusion to adjust the installation angle of the docking main body in a plurality of levels in the adjusting position.

A plurality of protrusion caps with different lengths may be provided.

The support protrusion and the protrusion cap may be insertion-coupled with each other.

The angle adjusting unit further includes a separation preventing unit which prevents the support protrusion from being arbitrarily separated from the accommodating position and the adjusting position.

The separation preventing unit may include a curved unit which is provided to a contact area of the support protrusion and the protrusion accommodating unit to incline along a rotation direction of the support protrusion to supply an elastic force to a rotation of the support protrusion.

Embodiments of the present general inventive concept can also be achieved by providing a docking station which is electrically connected to a computer main body unit of a portable computer, the docking station including a docking main body which supports a rear area of the computer main body unit against an installation surface and is electrically connected with the computer main body unit and an angle adjusting unit which moves between an accommodating position accommodated to the docking main body and an adjusting position protruding from the docking main body and adjusts an installation angle of the docking main body with respect to the installation surface.

Embodiments of the present general inventive concept can also be achieved by providing a portable computer, including a computer main body unit, a display unit which is rotatably coupled to the computer main body unit, and a docking station which is electrically connected to the computer main body unit. The docking station includes a docking main body which supports a rear area of the computer main body unit against an installation surface and is electrically connected with the computer main body unit; and an angle adjusting unit which is rotatably coupled to the docking main body to adjust an installation angle of the docking main body with respect to the installation surface.

The angle adjusting unit may include a support unit which includes a hinge shaft, and a support protrusion which has a predetermined length in a transverse direction to an axial direction of the hinge shaft to rotate about the hinge shaft, and a hinge shaft accommodating unit which may be provided in the docking main body to accommodate the hinge shaft.

The hinge shaft accommodating unit may be provided in a pair to accommodate the opposite end parts of the hinge shaft, and the angle adjusting unit further includes a protrusion accommodating unit which is recessed from a bottom surface of the docking main body to accommodate the support protrusion between the pair of hinge shaft accommodating units.

The support protrusion may move between an accommodating position in which the support protrusion is accommodated to the protrusion accommodating unit, and an adjusting position in which the support protrusion rotates about the rotation shaft to adjust the installation angle of the docking main body.

The angle adjusting unit further includes an angle maintaining unit which prevents the support protrusion from rotating more than a predetermined angle to maintain the adjusting position.

The angle adjusting unit further includes a protrusion cap which is detachably coupled to the support protrusion, and elongates the support protrusion to adjust the installation angle of the docking main body in a plurality of levels in the adjusting position.

A plurality of protrusion caps with different lengths may be provided.

Embodiments of the present general inventive concept can also be achieved by providing a docking station electronically connected to a computer main body unit of a portable computer, the docking station comprising: a docking main body to support a flat surface of the computer main body unit against an upper casing of the docking main body; and an angle adjusting unit to adjust an installation angle of the docking main body with respect to an installation surface.

Embodiments of the present general inventive provides a method of connecting a computer main body unit of a portable computer with a docking station comprising: placing a portion of the computer main body on top of an upper casing of a docking main body to support the computer main body against an installation surface; and pivoting an angle adjusting unit about an axis within a lower casing of the docking main body to provide various installation angles of the docking main body with respect to the installation surface.

BRIEF DESCRIPTION OF THE DRAWINGS

These and/or other features of the present general inventive concept will become apparent and more readily appreciated from the following description of the exemplary embodiments, taken in conjunction with the accompanying drawings, in which.

DETAILED DESCRIPTION OF THE PREFERRED EMBODIMENTS

Figure 1:
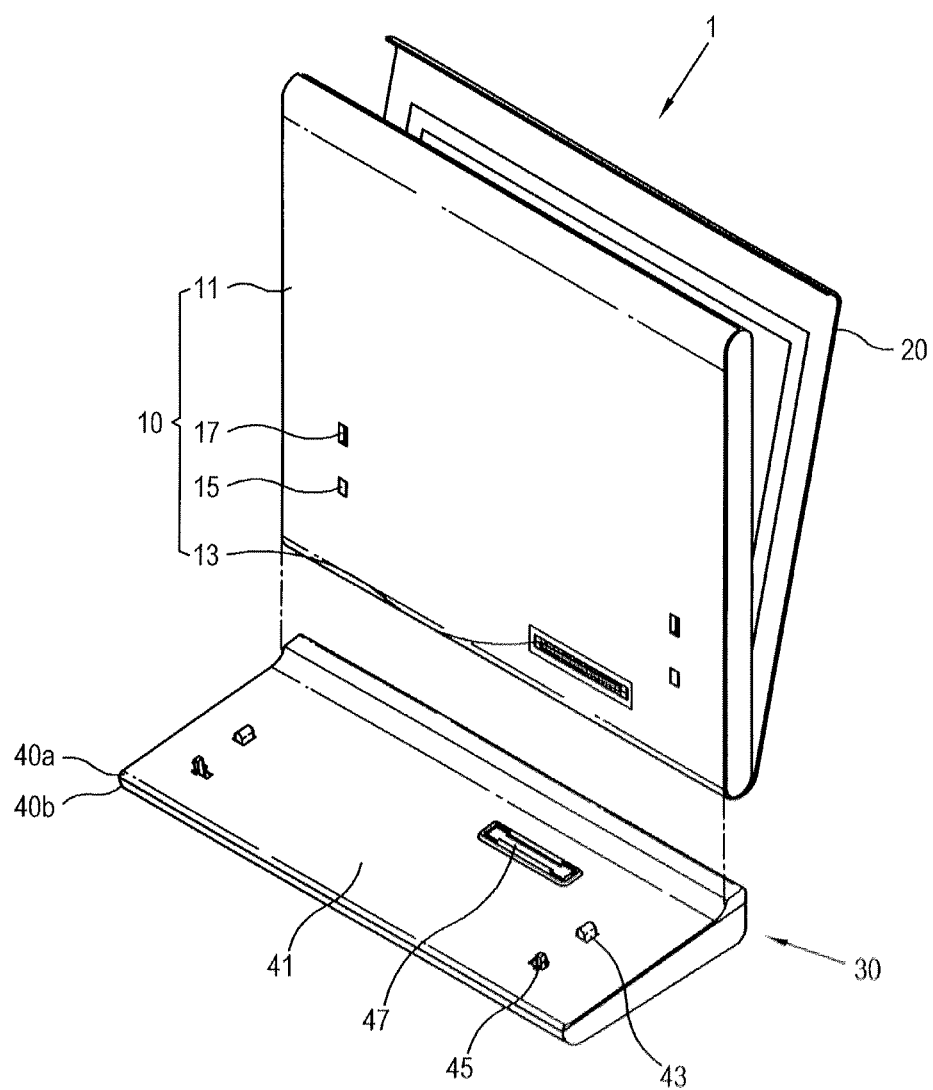
FIG. 1 is an pre-assembled view illustrating a coupling manner of a computer main body unit and a docking station according to an exemplary embodiment of the present general inventive concept.
Figure 2:
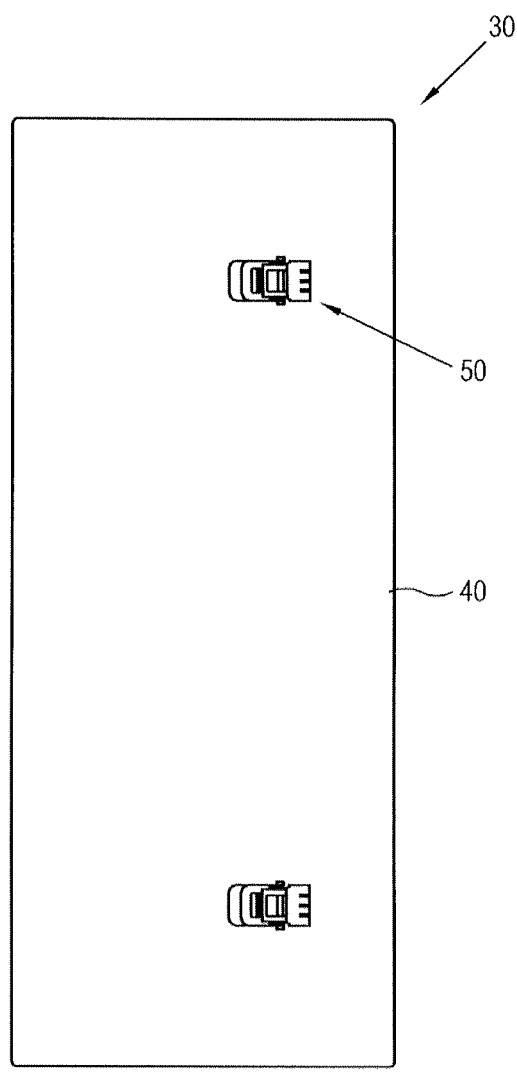
FIG. 2 is a bottom view of the docking station according to the exemplary embodiment of the present general inventive concept.
Figure 3:
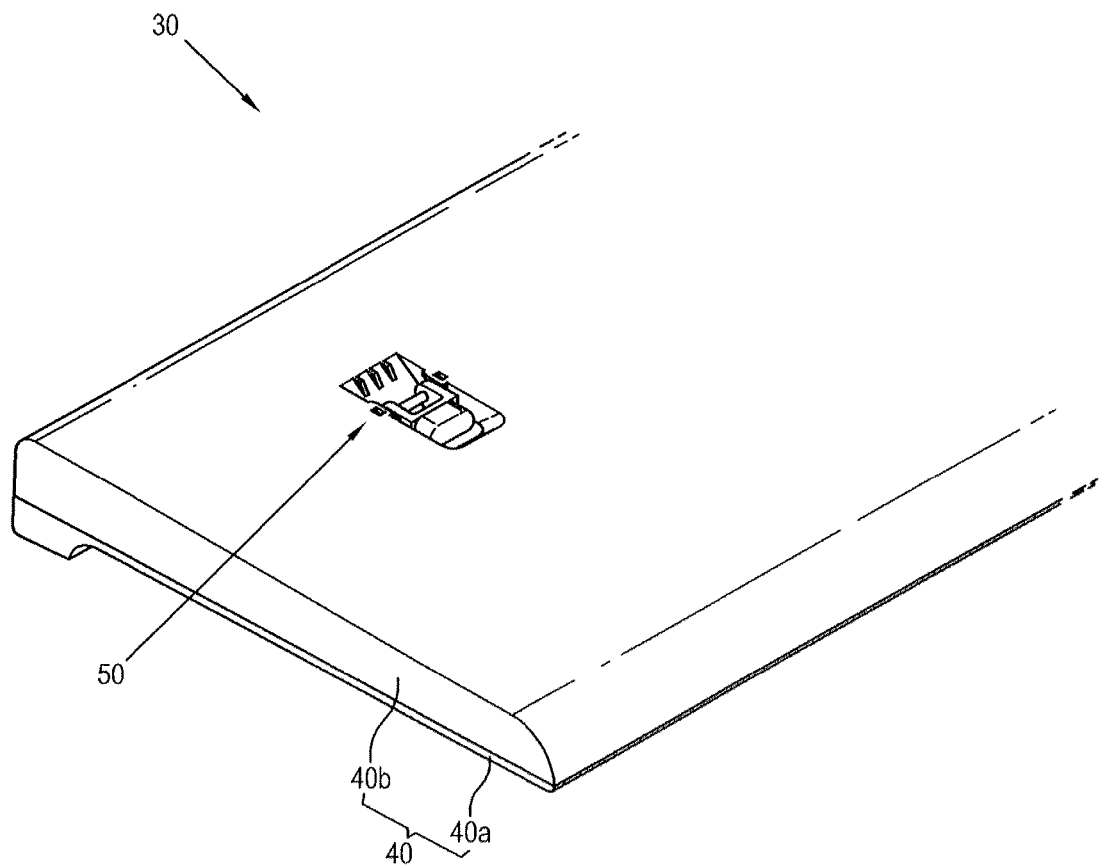
FIG. 3 is an enlarged bottom perspective view of an area of a bottom surface of the docking station according to the exemplary embodiment of the present general inventive concept.

Reference will now be made in detail to the embodiments of the present general inventive concept, examples of which are illustrated in the accompanying drawings, wherein like reference numerals refer throughout to like elements. The exemplary embodiments are described below in order to explain the present general inventive concept by referring to the figures.

Hereinafter, a docking station 30 and a portable computer 1 having the same and a method of connecting the docking station and portable computer according to an exemplary embodiment of the present general inventive concept will be described by referring to the figures.

The portable computer 1 according to the present exemplary embodiment includes a computer main body unit 10, a display unit 20 rotatably coupled to the computer main body unit 10, and the docking station 30 to support a rear area of the computer main body unit 10 to be electrically connected with the computer main body unit 10.

The computer main body unit 10 processes data. The computer main body unit 10 may be formed in a rectangular plate shape having a predetermined thickness, and includes an input unit (not shown) such as a keyboard, a touch pad, etc. on an upper surface thereof.

The computer main body unit 10 may include a main body casing 11 formed in a plate shape having a predetermined thickness to form an external appearance, a keyboard (not shown) and a touch pad (not shown) provided on an upper side of the main body casing 11 to input data, etc., and a central processing unit (not shown), a main board (not shown), an optional board (not shown), etc., can be accommodated inside the main body casing 11 to process data.

A main body connector 13 coupled with a docking connector 47 and a guide protrusion accommodating unit 15 accommodating a guide protrusion 43 are formed on a rear surface of the main body casing 11, that is, the lower surface seated at and supported by the docking station 30. Also, a hook coupling unit 17 may be formed to the computer main body unit 10 to detachably couple with a hook unit 45.

The main body connector 13 is electrically connected with the main board or the optional board inside the computer main body unit 10. The main body connector 13 has a standard connector corresponding to the docking connector 47 to be coupled thereto. The main body connector 13 is coupled to the main board accommodated in the main body casing 11. The main body connector 13 may be disposed in an inner space of the main body casing 11 so that the computer main body unit 10 can be horizontally and stably seated at an installation surface 100 when the computer main body unit 10 is seated on the installation surface 100 instead of the docking station 30.

The guide protrusion accommodating unit 15 can be formed to correspond to the size and shape of the guide protrusion unit 43 to accommodate the guide protrusion unit 43.

The hook coupling unit 17 can be formed in an elongated hole so that the hook unit 45 can reciprocate and be detachably coupled thereto.

The docking station 30 includes a docking main body 40 supporting a rear area of the computer main body unit 10 against the installation surface 100, and may be electrically connected with the computer main body unit 10, and an angle adjusting unit 50 rotatably coupled to the docking main body 40 to adjust an installation angle of the docking main body 40 against the installation surface 100. (See FIGS. 6A-6C.)

The docking main body 40 may include upper and lower casings 40a and 40b, a circuit board (not shown) interlocking with the computer main body unit 10 to control an operation of the docking station 30, and the docking connector 47 connecting the circuit board and the main body connector 13.

Together with the lower casing 40b, the upper casing 40a forms an external appearance of the docking station 30, and provides a space in which various hardwares including the circuit board can be are accommodated.

An upper surface of the upper casing 40a is formed with a seating unit 41 to which the rear area of the main body casing 11 is seated. That is, the rear area of the main body casing 11 is seated to the docking station 30, and a front area thereof is seated on the installation surface 100. Also, the seating unit 41 can be provided with the guide protrusion unit 43 coupled with the guide protrusion accommodating unit 15 formed to the main body casing 11, and the hook unit 45 coupled to the hook coupling unit 17.

At least one of the guide protrusion unit 43 can be provided to an upper surface of the upper casing 40a. The guide protrusion unit 43 may accommodate the guide protrusion accommodating unit 15 of the computer main body unit 10 to determine a coupling position of the computer main body unit 10 and the docking station 30. Also, the guide protrusion unit 43 may accommodate the guide protrusion accommodating unit 15 to maintain the coupling state of the main body connector 13 and the docking connector 47 against a side direction pressure which may be applied when the main body connector 13 and the docking connector 47 are coupled; thus preventing damage to the computer main body unit 10 and docking station 30.

The guide protrusion unit 43 according to the present exemplary embodiment may include two protrusions protruding from the upper area of the upper casing 40a to be symmetrical with respect to the opposite sides of the docking connector 47. Alternatively, the guide protrusion unit 43 may include a single or at least three protrusions.

The hook unit 45 can be provided to the upper casing 40a, and electrically reciprocates in a planar direction to be coupled and withdrawn to and from the hook coupling unit 17 of the computer main body unit 10. The hook unit 45 can be hook-coupled to the hook coupling unit 17 to prevent the computer main body unit 10 from being arbitrarily separated from the docking station 30. Also, a separation button (not shown) may be provided to the upper casing 40a to operate the hook unit 45 to separate the computer main body unit 10 mounted to the docking station 30.

The angle adjusting unit 50 can be mounted to the lower casing 40b. The lower casing 40b can be formed with a protrusion accommodating unit 65 and a hinge shaft accommodating unit 60 accommodating a support protrusion 55 and a hinge shaft 53.

The docking connector 47 may be connected to the circuit board, and an area thereof is exposed to the outside of the upper casing 40a. Accordingly, the docking connector 47 can be coupled with the main body connector 13 to allow the computer main body unit 10 and the docking station 30 to send and receive power and data therebetween. The docking connector 47 and the main body connector 13 corresponding thereto may have the standard IEEE1394 interface type to ensure that rebooting of the computer main body unit 10 is unnecessary in attaching and detaching of the computer main body unit 10 therethrough. However, the interface of the docking connector 47 may include various alternative types, such as a USB interface, etc.

The angle adjusting unit 50 may include a support unit 51 including the hinge shaft 53 and the support protrusion 55 having a predetermined length in a transverse direction to an axial direction of the hinge shaft 53 to rotate about the hinge shaft 53, and the hinge shaft accommodating unit 60 provided in the docking main body 40 to accommodate the hinge shaft 53. The angle adjusting unit 50 can be disposed to a lower and rear area of the docking main body 40. The angle adjusting unit 50 can also be provided in a pair to the opposite sides of the docking main body 40. Alternatively, at least three angle adjusting units 50 may be provided.

The opposite end parts of the hinge shaft 53 can be accommodated to the hinge shaft accommodating unit 60. Here, a pair of hinge shaft accommodating units 60 are formed to a bottom surface of the lower casing 40b to accommodate the opposite end parts of the hinge shaft 53. Also, the protrusion accommodating unit 65 can be recessed from the bottom surface of the docking main body 40 to accommodate the support protrusion 55 between the pair of hinge shaft accommodating units 60. That is, the protrusion accommodating unit 65 can be recessed from the bottom surface of the lower casing 40b toward an upper part, and the pair of hinge shaft accommodating units 60 can be formed through the opposite sides of the protrusion accommodating unit 65.

The hinge shaft 53 may be formed of a metal material. Accordingly, although a computer main body unit 10 having a large size can be seated on the docking station 30, a sufficient supporting strength can be supplied to support the computer main body unit 10.

Figure 5A:
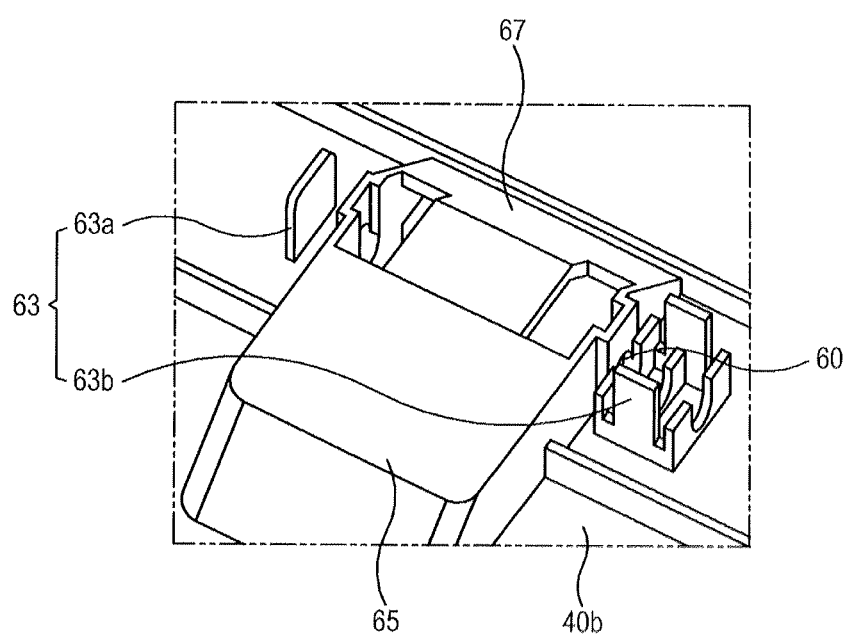
FIGS. 5A and 5B are views illustrating an inner surface of a lower casing to show a hinge shaft of the docking station according to the exemplary embodiment of the present general inventive concept coupled to the lower casing.
Figure 5B:
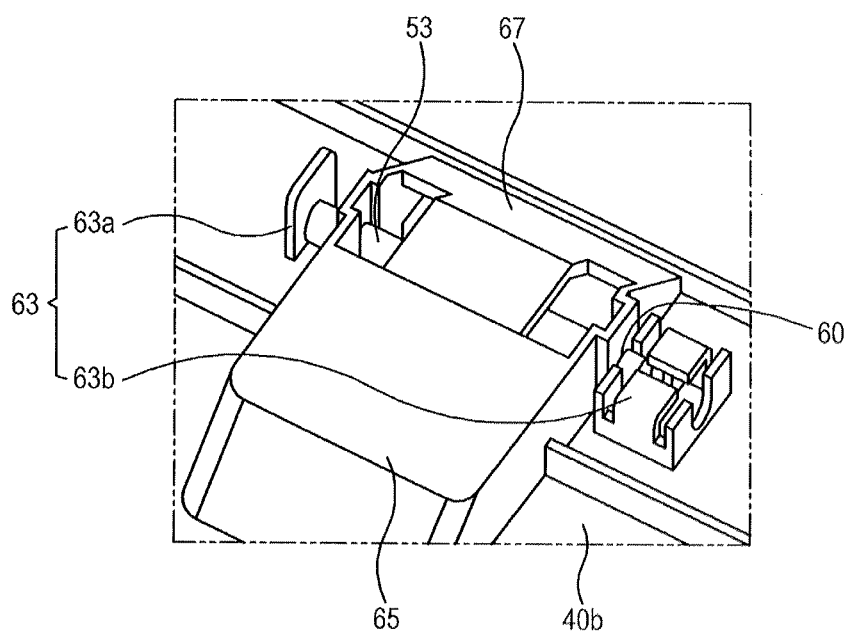

As shown in FIGS. 5A and 5B, in an inner surface of the lower casing 40b, a hinge shaft stationary unit 63 may be provided to the opposite sides of the hinge shaft accommodating unit 60. The hinge shaft stationary unit 63 may prevent the hinge shaft 53 from being separated from the hinge shaft accommodating unit 60 in the axial direction thereof. The hinge shaft stationary unit 63 may include a first hinge shaft stationary unit 63a and a second hinge shaft stationary unit 63b upwardly protruding from an inner surface of the lower casing 40b to support the opposite end parts of the hinge shaft 53.

The first shaft stationary unit 63a can be disposed so that a planar direction thereof can face the axial direction of the hinge shaft 53. The second shaft stationary unit 63b can be disposed so that a planar direction thereof can be in parallel with the axial direction of the hinge shaft 53. In the present exemplary embodiment, the second shaft stationary unit 63b can be provided as a pair to be distanced from each other. Alternatively, the second hinge shaft stationary unit 63b may be provided as a single element. That is, the first hinge shaft stationary unit 63a can be bent in the axial direction of the hinge shaft 53 from an inner surface of the lower casing 40b adjacent to the hinge shaft accommodating unit 60, and the second hinge shaft stationary unit 63*b* can be bent in a transverse direction to the axial direction of the hinge shaft 53.

Per the assembling process of the hinge shaft 53 as described, an end part of the hinge shaft 53 can be inserted to the hinge shaft accommodating unit 60 from an interval of the pair of second hinge shaft stationary unit 63*b*. The hinge shaft 53 may pass through the hinge shaft accommodating unit 60 and a hinge shaft through hole 57*a* formed to the support protrusion 55, and an end part of the hinge shaft 53 may contact the first hinge shaft stationary unit 63*a* to be prevented from further movement in the axial direction. The hinge shaft 53 may be inserted until the hinge shaft 53 contacts the first hinge shaft stationary unit 63*a*, and, as shown in FIG. 5B, the second hinge shaft stationary unit 63*b* can be bent to block the other end part of the hinge shaft 53.

Figure 6A:
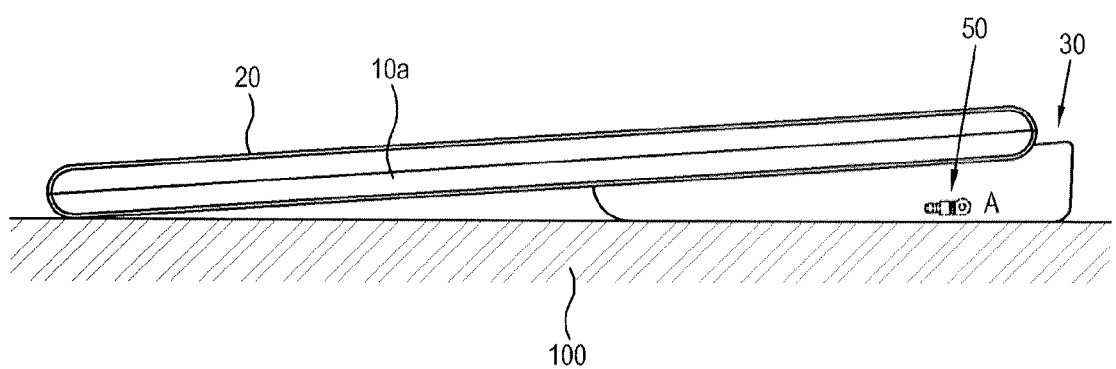
FIGS. 6A to 6C are operation state views illustrating an operation state of the angle adjusting unit depending on the size of the computer main body unit of the portable computer according to the exemplary embodiment of the present general inventive concept.

The support protrusion 55 rotates about the hinge shaft 53, and reciprocates between an accommodating position A accommodated to the protrusion accommodating unit 65, as shown in FIG. 6A, and an adjusting position B adjusting an installation angle of the docking main body 40. The support protrusion 55 may include a support main body 57 formed with the hinge shaft through hole 57*a* through which the hinge shaft 53 passes, and a protrusion unit 59 protruding from the support main body 57 in a predetermined length in a transverse direction to the axial direction of the hinge shaft 53.

The protrusion accommodating unit 65 may be recessed to a front area of the hinge shaft accommodating unit 60, wherein the protrusion accommodating unit 65 may have such a depth corresponding to the thickness of the support protrusion 55 to sufficiently accommodate the support protrusion 55. Also, the protrusion accommodating unit 65 may have such a size as to accommodate the support protrusion 55 when a protrusion cap 70 is coupled to the support protrusion 55.

An angle maintaining unit 67 may be formed to a rear area of the protrusion accommodating unit 65 to prevent the support protrusion 55 from further rotating more than a predetermined angle to maintain the adjusting position B. That is, inclination of the angle maintaining unit 67 may determine the adjusting position B, and the support protrusion 55 contacts and supports_the angle maintaining unit 67 in the adjusting position B. The angle maintaining unit 67 has an angle range of 100 degrees to 160 degrees with respect to the protrusion accommodating unit 65, and may have an angle range of 130 degrees to 150 degrees.

The hinge shaft through hole 57*a* may be formed through the support main body 57 in the axial direction of the hinge shaft 53 so that the support protrusion 55 can rotate about the hinge shaft 53. The support main body 57 includes a contact unit 57*b* contacting to the angle maintaining unit 67 in the adjusting position B.

The protrusion unit 59 may protrude from the support main body 57 in a transverse direction to the axial direction of the hinge shaft 53 to determine an installation angle of the docking station 30 in the adjusting position B. The protrusion unit 59 may contact and be supported on the installation surface 100 in the adjusting position B. The protrusion cap 70 may be coupled to the protrusion unit 59.

The angle adjusting unit 50 may further include the protrusion cap 70 detachably coupled to the support protrusion 55, and elongating the support protrusion 55 to adjust the installation angle of the docking main body 40 in a plurality of levels in the adjusting position B. The protrusion cap 70 may be coupled to the protrusion unit 59 to elongate the length of the support protrusion 55. Accordingly, the protrusion cap 70 may be provided with a plurality of different lengths. Accordingly, since the installation angle of the docking main body 40 is capable of being adjusted to a plurality of levels depending on the length of the protrusion cap 70 coupled to the protrusion unit 59, a computer main body unit 10 having various sizes is capable of being coupled to the docking station 30.

The protrusion unit 59 and the protrusion cap 70 can be insertion-coupled with each other. Also, an engagement unit can be provided between the protrusion unit 59 and the protrusion cap 70 to prevent the insertion-coupling thereof from being arbitrarily withdrawn. The engagement unit may include an engagement groove 80 formed to the protrusion unit 59, and an engagement prominence (not shown) formed to an inner surface of the protrusion cap 70. Alternatively, on the contrary, the engagement groove 80 may be provided to the protrusion cap 70, and the engagement prominence may be provided to the protrusion unit 59.

The protrusion unit 59 and the protrusion cap 70 may be provided to be forcedly insertion-coupled with each other. In this case, the engagement unit may be unnecessary.

Figure 4:
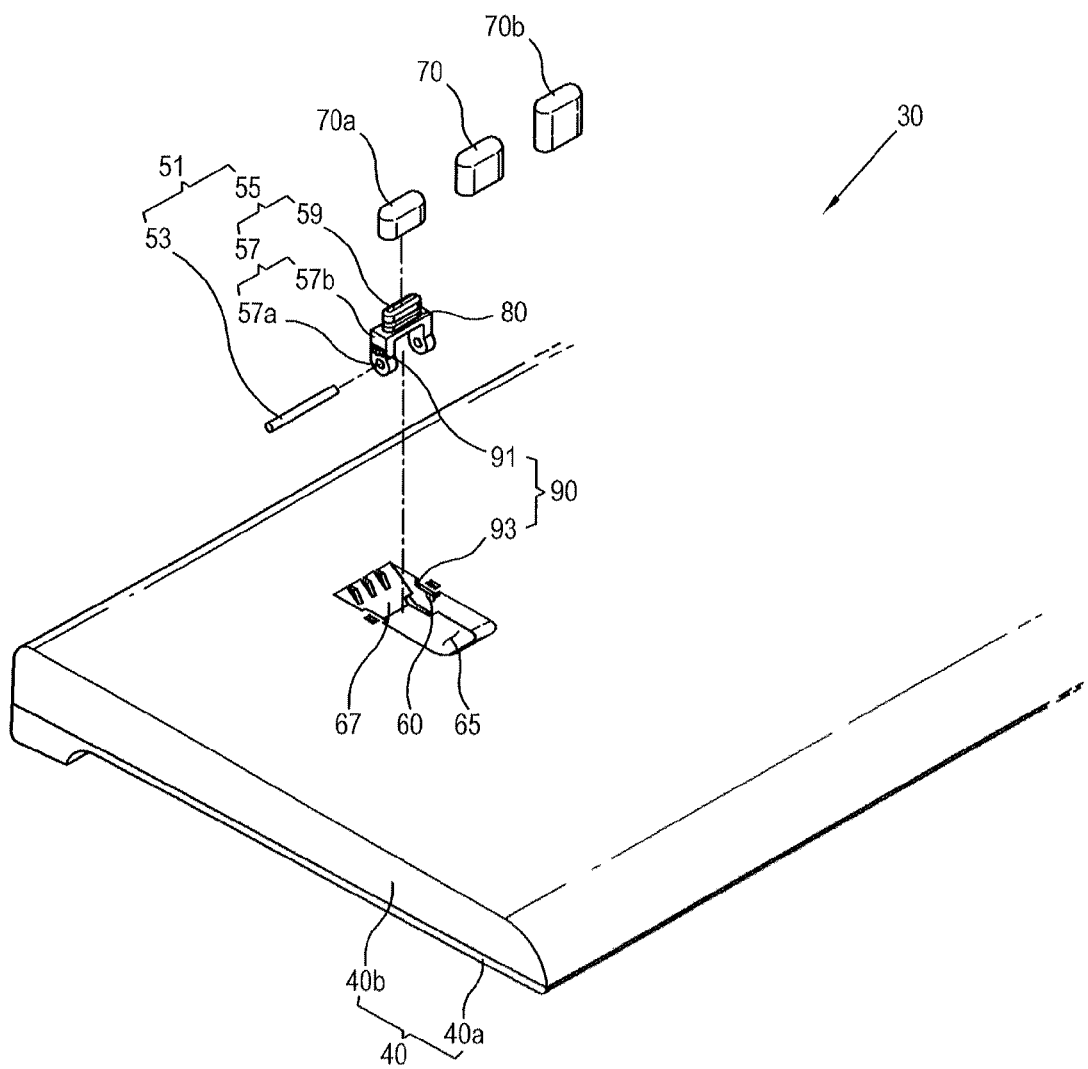
FIG. 4 is an exploded perspective view of an angle adjusting unit of the docking station according to the exemplary embodiment of the present general inventive concept.

The angle adjusting unit 50 may further include a separation preventing unit 90 (See FIG. 4) to prevent the support protrusion 55 from being arbitrarily separated from the accommodating position A and the adjusting position B. The separation preventing unit 90 may provide a contact area of the support protrusion 55 and the protrusion accommodating unit 65 to incline along a rotation direction of the support protrusion 55, and is formed in a curved part supplying an elastic force to a rotation of the support protrusion 55.

The separation preventing unit 90 may include a first curved unit 91 protruding from a side of the support main body 57 to incline in the axial direction of the hinge shaft 53. The first curved unit 91 may be provided on opposite sides of the support main body 57, or may be provided to a single side thereof.

The separation preventing unit 90 may further include a second curved unit 93 protruding from the hinge shaft accommodating unit 60 to incline toward the support main body 57. The second curved unit 93 may supply some resistance to the first curved unit 91 when the support protrusion 55 rotates.

The second curved unit 93 may supply resistance to the rotation of the first curved unit 91 at the accommodating position A to prevent the support protrusion 55 from being arbitrarily separated from the protrusion accommodating unit 65. Also, when a user starts rotating the support protrusion 55, the first curved unit 91 and the second curved unit 93 may provide friction about each other to supply elastic forces to each other. If the support protrusion 55 is rotated by a bigger angle, the first curved unit 91 may be guided by means of the second curved unit 93 to move to the adjusting position B. The second curved unit 93 may supply resistance to the rotation of the first curved unit 91 at the adjusting position B to prevent the support protrusion 55 from being separated from the angle maintaining unit 67.

In the present exemplary embodiment, the separation preventing unit 91 may include only the first curved unit 91, or may include the first curved unit 91 and the second curved unit 93. Alternatively, the separation preventing unit 93 may include only the second curved unit 93.

In the present exemplary embodiment, the angle adjusting unit 50 may be provided so that the support protrusion 55 can rotate with respect to the docking main body 40 to reciprocate between the accommodating position A and the adjusting position B. Alternatively, the angle adjusting unit 50 may be provided so that the support protrusion 55 can slidingly move with respect to the docking main body 40 to reciprocate between the accommodating position A and the adjusting position B.

Hereinafter, an operation process of the portable computer 1 according to the present exemplary embodiment will be described by referring to FIGS. 6A through 6C.

At first, for the convenience of description, the computer main body unit 10 may be classified as a large main body unit, a middle main body unit and a small main body unit according to the size thereof. Also, an operation of the angle adjusting unit 50 will be described according to the type of the computer main body unit 10.

If the computer main body unit 10 is provided as a large main body unit 10a as shown in FIG. 6A, then the support protrusion 55 may be moved to the accommodating position A accommodated to the protrusion accommodating unit 65.

Figure 6B:
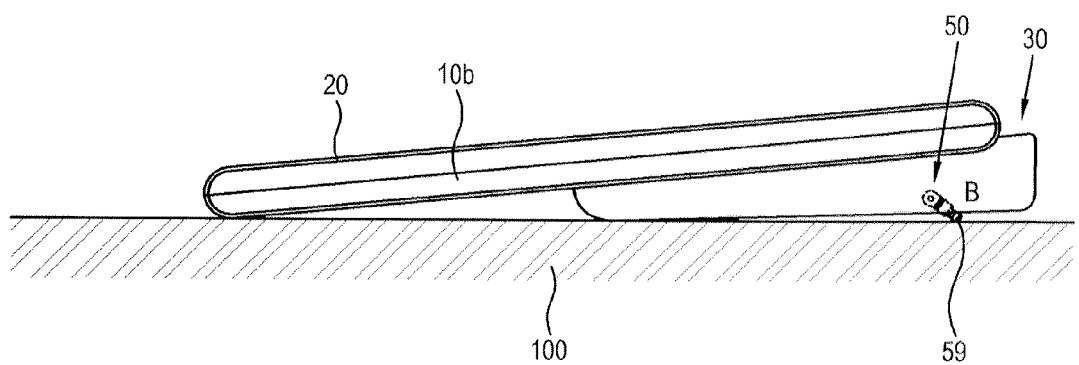

If the computer main body unit 10 is provided as a middle main body unit 10b as shown in FIG. 6B, then the support protrusion 55 may be rotated to be moved to the adjusting position B.

Figure 6C:
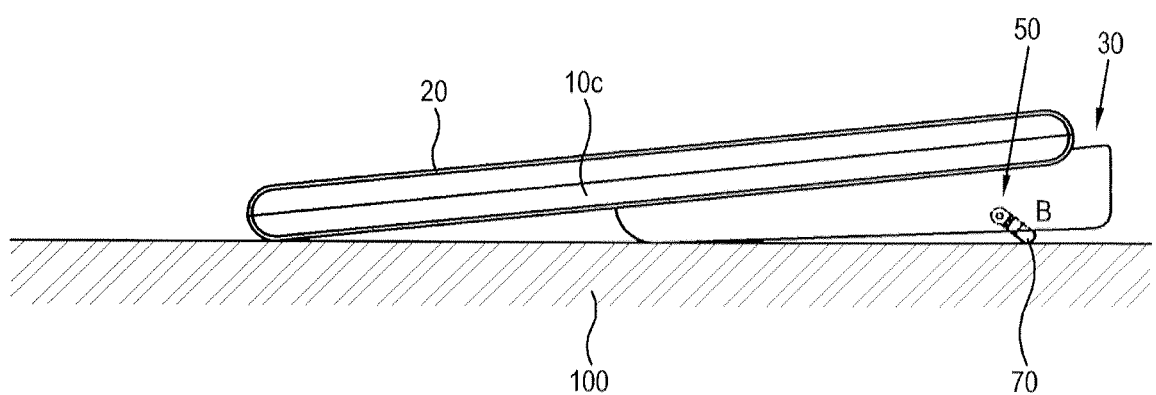

If the computer main body unit 10 is provided as a small main body unit 10c as shown in FIG. 6C, then the protrusion cap 70 is coupled to the protrusion unit 59 when the support protrusion 55 is rotated to be moved to the adjusting position B.

If the computer main body unit 10 is smaller than the small main body unit 10c, a protrusion cap 70b having a length longer than the protrusion cap 70 may be is applied in case the small main body unit 10c is coupled to the protrusion unit 59 when the support protrusion 55 is rotated to be moved to the adjusting position B.

Also, if the computer main body unit 10 is larger than the small main body unit 10c and smaller than the middle main body unit 10b, a protrusion cap 70a having a length smaller than the protrusion cap 70 may be applied in case the small main body unit 10c is coupled to the protrusion unit 59 when the support protrusion 55 is rotated to be moved to the adjusting position B.

As describe above, in the present exemplary embodiment, the angle adjusting unit 50, rotatably coupled to the docking main body 40 to adjust the installation angle of the docking main body 40 against the installation surface 100, may be provided in order for the docking station 30 to be capable of being applied to a computer main body unit 10 having two sizes without unstable installation according to the accommodating position A and the adjusting position B of the support protrusion 55.

Also, the protrusion cap 70 detachably coupled to the support protrusion 55 may be provided to elongate the support protrusion 55 to adjust the installation angle of the docking main body 40 in the adjusting position B. Accordingly, the docking station 30 is capable of being applied to a computer main body unit 10 having three sizes and a portable computer 1 having the same three different sizes can also be accommodated by the docking station 30.

Also, if the protrusion cap 70 coupled to the support protrusion 55 is provided in plural to have different lengths, since the installation angle of the docking main body 40 is capable of being adjusted to have a plurality of levels depending on the type of the coupled protrusion cap 70, then the docking station 30 is capable of being applied to a computer main body unit 10 having various sizes greater than four, and the portable computer 1 having the same various sizes can also be accommodated by the docking station 30.

As described above, the present general inventive concept may provide a docking station and a portable computer applied to a computer main body unit having various sizes.

Although a few exemplary embodiments of the present general inventive concept have been shown and described, it will be appreciated by those skilled in the art that changes may be made in these exemplary embodiments without departing from the principles and spirit of the general inventive concept, the scope of which is defined in the appended claims and their equivalents.

What is claimed is:

1. A docking station to support a portable computer having a first end and an opposing second end, on an installation surface, the docking station comprising:
   a main body configured to support the first end of the portable computer against the installation surface and to electrically connect with the portable computer; and
   an angle adjusting unit that is rotatably coupled to the main body and is configured to adjust an installation angle between an upper surface of the main body and the installation surface such that the second end of the portable computer directly contacts the installation surface when the portable computer has any one of a plurality of different sizes, the angle adjusting unit including:
      a support unit, accommodated by a protrusion accommodating unit, having a hinge shaft and a support protrusion that extends lengthwise in a direction transverse to an axial direction of the hinge shaft and is rotatable about the hinge shaft;
      at least one hinge shaft stationary unit protruding from an inner surface of a lower casing of the docking station and supporting at least one end part of the hinge shaft, to prevent movement of the hinge shaft in an axial direction; and
      a separation preventing unit including a curved unit disposed at a contact area of the support protrusion and the protrusion accommodating unit, to apply an elastic force to a rotation of the support protrusion.

2. The docking station according to claim 1, wherein the angle adjusting unit further comprises:
   a hinge shaft accommodating unit disposed in the main body to accommodate the hinge shaft.

3. The docking station according to claim 2, wherein the hinge shaft comprises a metal material.

4. The docking station according to claim 2, further comprising a pair of the hinge shaft accommodating units to accommodate the opposite end parts of the hinge shaft,
   wherein the protrusion accommodating unit is recessed into the lower surface of the main body to accommodate the support protrusion between the pair of hinge shaft accommodating units.

5. The docking station according to claim 4, wherein the support protrusion moves between an accommodating position in which the support protrusion is accommodated in the protrusion accommodating unit, and an adjusting position in which the support protrusion is rotated about the hinge shaft to adjust the installation angle of the main body.

6. The docking station according to claim 5, wherein the angle adjusting unit further comprises an angle maintaining unit that prevents the support protrusion from rotating more than a predetermined angle, to maintain the adjusting position.

7. The docking station according to claim 6, wherein the angle adjusting unit is disposed adjacent to a hinge of the portable computer that connects a body of the portable computer to a display of the portable computer.

8. The docking station according to claim 5, wherein the angle adjusting unit further comprises a protrusion cap that is detachably coupled to the support protrusion to elongate the support protrusion, to adjust the installation angle of the main body.

9. The docking station according to claim 8, further comprising a plurality of protrusion caps having different lengths.

10. The docking station according to claim 8, wherein the support protrusion and the protrusion cap are insertion-coupled with each other.

11. The docking station according to claim 1, wherein the separation preventing unit prevents the support protrusion from being arbitrarily separated from the accommodating position and the adjusting position.

12. A docking station to support a portable computer having a first end and an opposing second end, on an installation surface, the docking station comprising:
- a main body configured to support the first end of the portable computer against the installation surface, and to electrically connect with the portable computer; and
- an angle adjusting unit that moves between an accommodating position in the main body and an adjusting position protruding from the main body, and adjusts an installation angle between an upper surface of the main body and the installation surface such that the second end of the portable computer directly contacts the installation surface when the portable computer has any one of a plurality of different sizes, the angle adjusting unit including:
  - a support unit, accommodated by a protrusion accommodating unit, having a hinge shaft and a support protrusion that extends lengthwise in a direction transverse to an axial direction of the hinge shaft and is rotatable about the hinge shaft;
  - at least one hinge shaft stationary unit protruding from an inner surface of a lower casing of the docking station and supporting at least one end part of the hinge shaft, to prevent movement of the hinge shaft in an axial direction; and
  - a separation preventing unit including a curved unit disposed at a contact area of the support protrusion and the protrusion accommodating unit, to apply an elastic force to a rotation of the support protrusion.

13. A portable computer system, comprising:
- a computer main body having a first end and an opposing second end;
- a display unit that is rotatably coupled to the computer main body;
- a docking main body that is electrically connected with the computer main body; and
- an angle adjusting unit that is rotatably coupled to the docking main body, to adjust an installation angle between an upper surface of the docking main body and the installation surface such that the second end of the computer main body directly contacts the installation surface when the portable computer has any one of a plurality of different sizes, the angle adjusting unit including:
  - a support unit, accommodated by a protrusion accommodating unit, having a hinge shaft and a support protrusion that extends lengthwise in a direction transverse to an axial direction of the hinge shaft and is rotatable about the hinge shaft;
  - at least one hinge shaft stationary unit protruding from an inner surface of a lower casing of the docking station and supporting at least one end part of the hinge shaft, to prevent movement of the hinge shaft in an axial direction; and
  - a separation preventing unit including a curved unit disposed at a contact area of the support protrusion and the protrusion accommodating unit, to apply an elastic force to a rotation of the support protrusion.

14. The portable computer according to claim 13, wherein the angle adjusting unit further comprises:
- a hinge shaft accommodating unit disposed in the docking main body to accommodate the hinge shaft.

15. The portable computer according to claim 14, further comprising a pair of the hinge shaft accommodating units to accommodate the opposite end parts of the hinge shaft,
wherein the protrusion accommodating unit is recessed into the bottom surface of the docking main body to accommodate the support protrusion between the pair of hinge shaft accommodating units.

16. The portable computer according to claim 15, wherein the support protrusion is configured to move between an accommodating position, in which the support protrusion is accommodated in the protrusion accommodating unit, and an adjusting position, in which the support protrusion is rotated about the rotation shaft to adjust the installation angle of the docking main body.

17. The portable computer according to claim 16, wherein the angle adjusting unit further comprises an angle maintaining unit that prevents the support protrusion from rotating more than a predetermined angle, to maintain the adjusting position.

18. The portable computer according to claim 17, wherein the angle adjusting unit further comprises a protrusion cap that is detachably coupled to the support protrusion to elongate the support protrusion and to adjust the installation angle of the docking main body.

19. The portable computer according to claim 18, further comprising a plurality of protrusion caps having different lengths.

20. A docking station to support a portable computer having a first end and an opposing second end, on an installation surface, the docking station comprising:
- a main body configured to support the first end of the portable computer against the installation surface; and
- an angle adjusting unit attached to a lower surface of the main body, to adjust an installation angle between an upper surface of the main body and the installation surface such that the second end of the portable computer directly contacts the installation surface when the portable computer has any one of a plurality of different sizes, the angle adjusting unit including:
  - a support unit, accommodated by a protrusion accommodating unit, having a hinge shaft and a support protrusion that extends lengthwise in a direction transverse to an axial direction of the hinge shaft and is rotatable about the hinge shaft;
  - at least one hinge shaft stationary unit protruding from an inner surface of a lower casing of the docking station and supporting at least one end part of the hinge shaft, to prevent movement of the hinge shaft in an axial direction; and
  - a separation preventing unit including a curved unit disposed at a contact area of the support protrusion and the protrusion accommodating unit, to apply an elastic force to a rotation of the support protrusion.

21. The docking station according to claim 20, wherein the angle adjusting unit is rotatable within the lower casing of the main body of the docking station.

22. The docking station according to claim 21, wherein the angle adjusting unit further comprises:
- a hinge shaft accommodating unit comprising a first hinge shaft stationary unit and a second hinge shaft stationary unit protruding from the lower casing, to support the opposite end parts of the hinge shaft.

23. A method of connecting a portable computer having a first end and an opposing second end with a docking station disposed on an installation surface, the method comprising:

attaching the first end of the portable computer to an upper surface of a main body of the docking station;

pivoting an angle adjusting unit about an axis within the main body such that the second end of the portable computer directly contacts the installation surface when the portable computer has any one of a plurality of different sizes, the angle adjusting unit having a support unit, accommodated by a protrusion accommodating unit, including a hinge shaft and a support protrusion that extends lengthwise in a direction transverse to an axial direction of the hinge shaft and is rotatable about the hinge shaft;

preventing movement of the hinge shaft in an axial direction, by supporting at least one end part of the hinge shaft using at least one hinge shaft stationary unit protruding from an inner surface of a lower casing of the docking station; and applying an elastic force to a rotation of the support protrusion with a separation preventing unit including a curved unit disposed at a contact area of the support protrusion and the protrusion accommodating unit.

24. The docking station according to claim 1, wherein the at least one hinge shaft stationary unit comprises at least one of a first hinge shaft stationary unit and a second hinge shaft stationary unit respectively disposed at opposite ends of the hinge shaft.

25. The docking station according to claim 24, wherein the first shaft stationary unit is bent in the axial direction, and the second shaft stationary unit is bent in a transverse direction.

26. The docking station according to claim 24, wherein the first shaft stationary unit has a first planar portion arranged to face the axial direction of the hinge shaft, and the second shaft stationary unit has at least one second planar portion arranged in parallel with the axial direction of the hinge shaft.

27. The docking station according to claim 26, wherein one end part of the hinge shaft contacts the first planar portion of the first hinge shaft stationary unit, and the other end part of the hinge shaft is disposed between a pair of the at least one second planar portion of the second hinge shaft stationary unit.

28. The docking station according to claim 26, wherein at least one of the first planar portion of the first hinge shaft stationary unit and the at least one second planar portion of the second hinge shaft stationary unit is bent to support the at least one end part of the hinge shaft.

* * * * *